United States Patent
Aull et al.

(10) Patent No.: US 7,417,626 B2
(45) Date of Patent: Aug. 26, 2008

(54) METHOD FOR PROCESSING DATA QUANTIFYING FORCE APPLIED TO ONE OR MORE KEYS OF A COMPUTER KEYBOARD

(75) Inventors: Randall E. Aull, Kenmore, WA (US); Firdosh K. Bhesania, Kirkland, WA (US); Michael William John McCracken, Redmond, WA (US); Hirofumi Yamamoto, Bellevue, WA (US); Steven N. Bathiche, Bellevue, WA (US); Timothy T. Brewer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 664 days.

(21) Appl. No.: 10/662,428

(22) Filed: Sep. 16, 2003

(65) Prior Publication Data

US 2005/0057521 A1  Mar. 17, 2005

(51) Int. Cl.
G09G 5/00 (2006.01)
(52) U.S. Cl. .................................................. 345/172
(58) Field of Classification Search .......... 345/172–174
See application file for complete search history.

(56) References Cited

U.S. PATENT DOCUMENTS

| | | | |
|---|---|---|---|
| 3,806,471 A | 4/1974 | Mitchell | |
| 4,296,406 A | 10/1981 | Pearson | |
| 4,314,227 A | 2/1982 | Eventoff | |
| 4,489,302 A | 12/1984 | Eventoff | |
| 5,008,497 A | 4/1991 | Asher | |
| 5,063,376 A | 11/1991 | Chang | |
| 5,231,386 A | 7/1993 | Brandenburg et al. | |

(Continued)

FOREIGN PATENT DOCUMENTS

| | | |
|---|---|---|
| GB | 1 255 761 | 12/1971 |
| JP | 405011914 A * | 1/1993 |

OTHER PUBLICATIONS

Eric Gray, "The Synclavier Digital Audio System: Recent Developments in Audio Post-Production," New England Digital, Mar. 1987.

(Continued)

*Primary Examiner*—Sumati Lefkowitz
*Assistant Examiner*—Tammy Pham
(74) *Attorney, Agent, or Firm*—Wolf, Greenfield & Sacks, P.C.

(57) ABSTRACT

A computer receives data from a keyboard having one or more keys which cause generation of keyboard data that quantitatively describe the relative force applied to those keys. The keyboard data are transmitted in an HID report containing identifiers for one or more keys that have been pressed and force data for each key. The force data may be a multi-bit value quantifying the key force, or a null indicator signaling that the key is not force-sensing. Keyboard data messages are then prepared which identify keys pressed, contain force data, and may indicate whether the force data updates previous force data. Force updates are only provided to application programs registering for key force data. In other aspects of the invention, key repeat messages are automatically generated for a key held pressed by a user. The key repeat messages are generated at a rate controlled by the amount of force applied to the key.

12 Claims, 11 Drawing Sheets

U.S. PATENT DOCUMENTS

| | | | |
|---|---|---|---|
| 5,299,125 A * | 3/1994 | Baker et al. | 704/9 |
| 5,302,936 A | 4/1994 | Yaniger | |
| 5,515,044 A | 5/1996 | Glatt | |
| 5,576,734 A * | 11/1996 | Daniele et al. | 345/168 |
| 5,675,329 A * | 10/1997 | Barker et al. | 341/22 |
| 5,999,084 A | 12/1999 | Armstrong | |
| 6,102,802 A | 8/2000 | Armstrong | |
| 6,135,886 A | 10/2000 | Armstrong | |
| 6,198,474 B1 | 3/2001 | Roylance | |
| 6,204,839 B1 | 3/2001 | Mato, Jr. | |
| 6,343,991 B1 | 2/2002 | Armstrong | |
| 6,347,997 B1 | 2/2002 | Armstrong | |
| 2002/0104369 A1 | 8/2002 | Baker et al. | |

OTHER PUBLICATIONS

R.D. Harrod, "Touch-Pressure Sensitive Frequency-Modulated Keyboard," IBM Technical Disclosure Bulletin, vol. 20, No. 10, pp. 4039-4040, Mar. 1978.

Joyce et al., "Identity Authentication Based on Keystroke Latencies," Communications of the ACM, vol. 33, No. 2, pp. 168-176, Feb. 1990.

Lieberman et al., "Caslo CZ-1 Digital Synthesizer: A User's Report," Computer Music Journal, pp. 86-88, Spring 1987.

Popovich et al., "Gradient formation in a micro-processor-based HPLC system," American Laboratory, pp. 136-139, May 1981.

H. Tang, "A multilevel input system with force-sensitive elements," Int. J. Human-Computer Studies, 2001 (54), pp. 495-507 Apr. 2001.

RegisterRawInputDevices Function; published prior to Sep. 12, 2003; printed from <http://msdn.microsoft.com/library>.

Keybdinput Structure; published prior to Sep. 12, 2003; printed from <http://msdn.microsoft.com/library>.

Device Stacks for USB Keyboard, Mouse, and Joystick Devices; published prior to Sep. 12, 2003; printed from <http://msdn.microsoft.com/library>.

Keyboard_Input_Data; published prior to Sep. 12, 2003; printed from <http://msdn.microsoft.com/library>.

Rawinputdevice Structure; published prior to Sep. 12, 2003; printed from <http://msdn.microsoft.com/library>.

WM_Input Notification; published prior to Sep. 12, 2003; printed from <http://msdn.microsoft.com/library>.

Rawinput Structure; published prior to Sep. 12, 2003; printed from <http://msdn.microsoft.com/library>.

Rawkeyboard Structure; published prior to Sep. 12, 2003; printed from <http://msdn.microsoft.com/library>.

WM_Keydown Notification; published prior to Sep. 12, 2003; printed from <http://msdn.microsoft.com/library>.

JP 05-11914A with computer-generated translation.

* cited by examiner

METHOD FOR PROCESSING DATA QUANTIFYING FORCE APPLIED TO ONE OR MORE KEYS OF A COMPUTER KEYBOARD

FIELD OF THE INVENTION

This invention relates to systems and methods for receiving and processing data from a computer keyboard. More specifically, this invention relates to systems and methods for receiving and distributing force data generated by a computer keyboard capable of quantitatively sensing the force exerted upon one or more keys.

BACKGROUND OF THE INVENTION

As more and more uses are found for computers, and as existing uses are augmented and improved, it is often necessary to provide increasing amounts of input to computers. Numerous input mechanisms already exist, and additional mechanisms continue to be developed. For many purposes, however, the computer keyboard remains the primary computer input device. As such, there are numerous possible advantages to increasing the amount of data that a user can input to a computer via a keyboard. As used herein, "keyboard" includes, but is not limited to, "QWERTY" computer keyboards as described by, e.g., International Standard ISO/IEC 9995-1.

One manner of increasing the data which a keyboard can input is by increasing the number of keys. For example, many keyboards contain standard function keys (e.g., F1, F2, etc.). Some keyboards have application-specific keys in addition to the common character and function keys; examples include a separate key which a user presses to connect to the Internet, etc. There are practical limits on the number of keys that can be added, however. If the keys become too numerous, some of the keys may be difficult to reach, and users may have difficulty remembering the purposes of all keys.

As another alternative, additional functions can be added to existing keys. For example, many keyboards are configured so that certain keys generate a first signal if a key is pressed in isolation and another signal if the key is pressed in combination with a "modifier" key (e.g., the CTRL, ALT or SHIFT keys). Although it is possible to add additional modifier keys so as to assign even more possible functions to existing keys, this also has practical limits. Users are unlikely to remember all functions corresponding to all possible key combinations, and software developers are often unlikely to uniformly assign the same function to a particular key combination.

Force-sensing keys offer an advantageous way to increase the amount of data that a user can input with a computer keyboard. In most existing keyboards, a given key can only have two states; the key is either pressed (i.e., it is "down") or it is not pressed (i.e., it is "up"). Because of this, a single key can only generate two values. A force-sensing key, on the other hand, can generate (or cause the generation of) a range of values corresponding to the amount of force exerted on the key. Pressing the key lightly may generate one signal, pressing slightly harder may generate another signal, pressing even harder may generate a third signal, etc. The additional signals can then be given meanings related to a character or function assigned to the key.

A keyboard having one or more force-sensing keys presents many data processing challenges. Indeed, the present inventors are unaware of any computer operating system software that provides a way of receiving force data from individual keys and providing that information to application software. Moreover, an operating system able to process key force data would, in all probability, also be used in combination with non-force-sensing keyboards. Accordingly, compatibility with both types of keyboards would be highly advantageous. Similarly, not all software applications may be able to use the additional data provided by a force-sensing keyboard, and key force data should be processed in a manner compatible with applications that do not use key force data.

SUMMARY OF THE INVENTION

The present invention addresses the above and other challenges associated with processing key force data received from a keyboard with one or more force-sensing keys. In one embodiment, the invention includes a method of processing data received from a keyboard having a plurality of keys. At least some keys in that plurality have characters respectively assigned to them. The plurality of keys further includes one or more force-sensing keys, and the method includes receiving keyboard data sets that report, for keys of the plurality pressed by a keyboard user, key force data and key identification data. The method further includes determining whether key force data in a keyboard data set updates, for a key the user is continuing to press, force data that was previously-reported. The method also includes generating first type keyboard data messages that contain force updates based on updated key force data, key identifiers for the keys associated with the updated key force data, and force update indicators. The method additionally includes generating second type keyboard data messages that identify initially pressed keys and forces applied to the initially pressed keys. The first and second type keyboard data messages may have a common data structure. In still other embodiments, a null indicator is used to indicate a non-force-sensing key.

Another embodiment of the invention includes receiving a keyboard data set reporting, for multiple keys pressed by a keyboard user, key force data and key identification data. The key identification data is parsed into an ordered list of key identifiers, and the key force data is parsed into an ordered list of key force values. Key identifiers and force values are associated based on the orders in which the key identification data and the key force data appear in the keyboard data set.

In yet another embodiment of the invention, a registration is received from a first application program requesting keyboard input data and key force data. A registration is also received from a second application program requesting keyboard input data. This embodiment further includes receiving keyboard data messages identifying keys that have been pressed by a user and containing force values for forces applied to the pressed keys. A first keyboard input message identifying a first pressed key and containing the force value for the first pressed key are generated. Similarly, a second keyboard input message identifying a second pressed key and containing the force value for the second pressed key and a force update indicator are generated. Keyboard input messages containing force updates are only provided to applications registering for key force data.

These and other features and advantages of the present invention will be readily apparent and fully understood from the following detailed description of preferred embodiments, taken in connection with the appended drawings.

DETAILED DESCRIPTION OF THE PREFERRED EMBODIMENTS

The present invention is described using data structures, software architecture and other concepts of the type found in the WINDOWS® operating system software (available from Microsoft Corporation of Redmond, Wash.), and with reference to Human Interface Device (HID) reports generated in compliance with the Device Class Definition for Human Input Devices, the Universal Serial Bus (USB) Specification, the USB HID Usage Tables, Human Interface Device Profile v.1.0, and other related documents available from the USB Implementers Forum, Inc. at <http://www.usb.org>or from Bluetooth SIG, Inc. at <http://www.bluetooth.com>. However, the invention is not limited to such implementations, and may also be implemented in other software environments and using other data formats.

Figure 1:
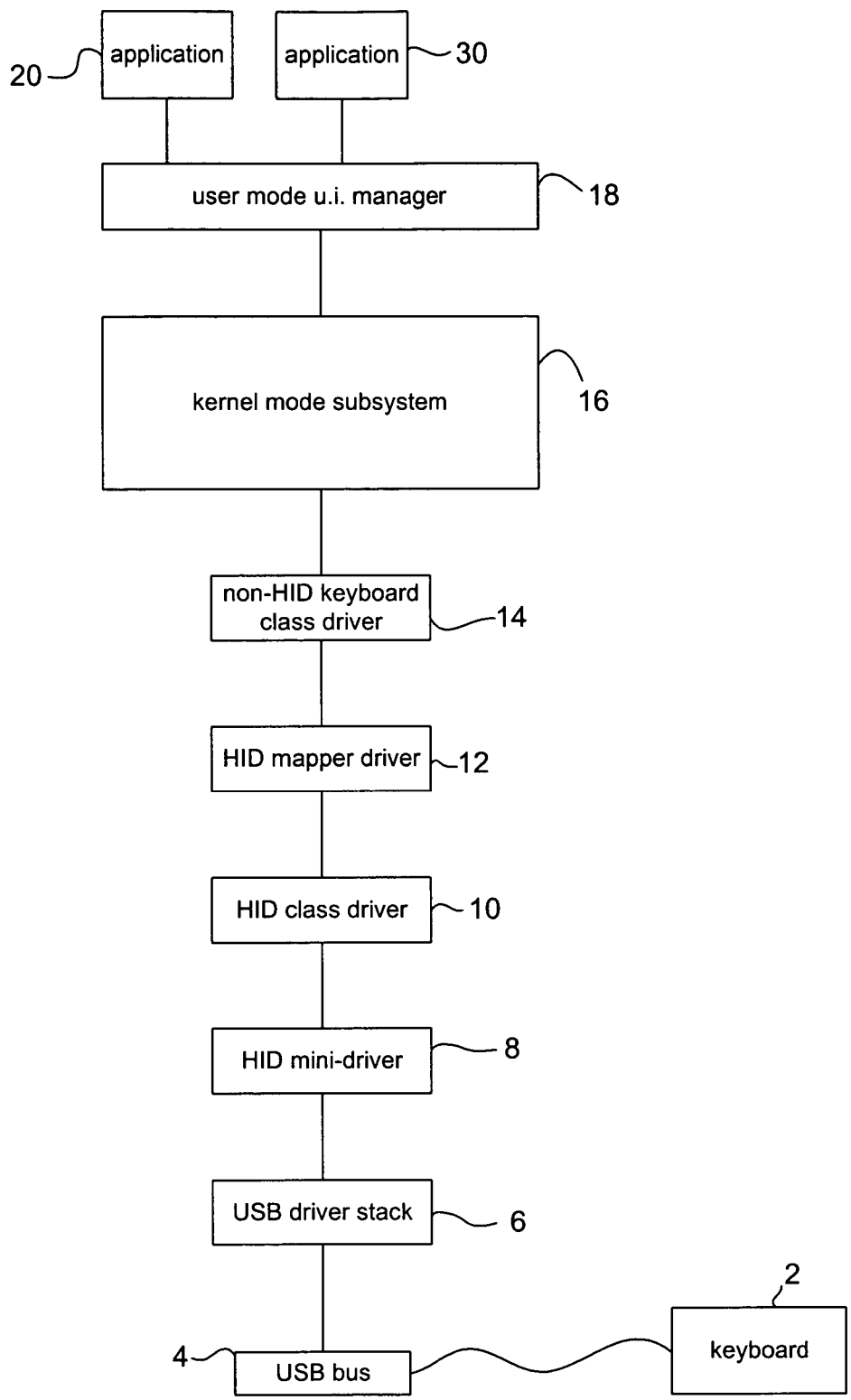
FIG. 1 is a block diagram showing various levels of software through which a keyboard communicates with application programs in at least one embodiment of the invention.

FIG. 1 is a block diagram showing various levels of driver and other software through which a force sensing keyboard 2 communicates with two application software programs 20 and 30. FIG. 1 generally reflects an architecture used in the WINDOWS® operating system, although various software components are omitted so as not to obscure the drawing with unnecessary detail. The architecture and components of FIG. 1 merely provide one example of an environment in which the invention can be implemented. The invention is not limited by the components or architecture of FIG. 1. The invention could alternatively be implemented in other architectures and/or using other software components.

Key data is initially generated by keyboard 2 when a user presses, changes the force exerted upon, or releases a key. The details of the manner in which keyboard 2 generates this key data are not necessary to understanding the present invention, and are therefore not discussed further. However, various embodiments of a force-sensing keyboard are described in commonly-assigned U.S. patent application Ser. No. 10/662,459, titled "Computer Keyboard with Quantitatively Force-Sensing Keys" and filed simultaneously herewith, the contents of which are incorporated by reference herein. Keyboard 2 outputs key data in the form of a Human Interface Device (HID) report.

Figure 2:
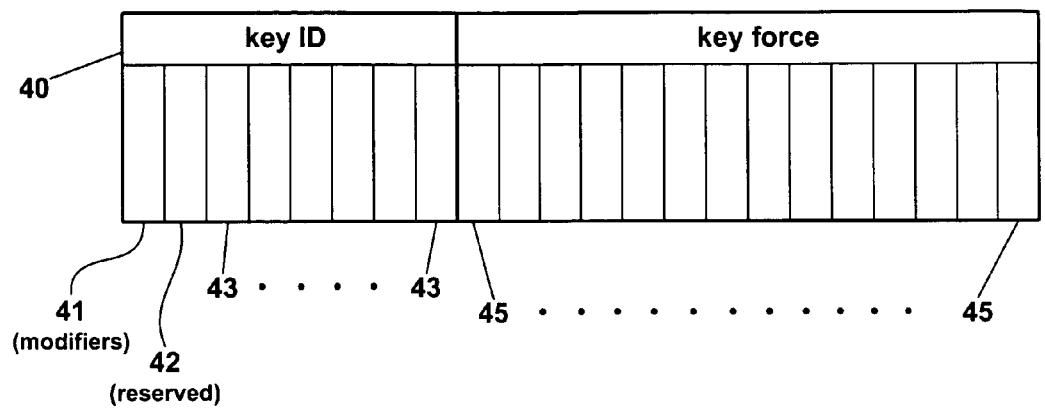
FIG. 2 is a block diagram of a Human Interface Device (HID) report.

FIG. 2 is an example of an HID report 40 from keyboard 2. Each of boxes 41 through 45 represents a 1-byte value. Box 41 contains eight bits that represent the states of eight modifier keys (left control, left shift, left alt, left GUI, right control, right shift, right alt, right GUI). A "0" in a bit position indicates the modifier key corresponding to that bit position is not pressed, and a "1" indicates that the corresponding modifier key is pressed. Box 42 is a reserved field, i.e., it is a 1-byte length field intentionally not used and reserved for other purposes. Boxes 43 can each contain an identifying code for another key on keyboard 2. The code(s) in box(es) 43 can be, e.g., keyboard page usage IDs as set forth in the USB HID Usage Tables. Boxes 45 contain 1-byte values for the amount of force applied to the keys identified as pressed in boxes 41 and 43. In one embodiment of the invention, force values between 0000 0001 (decimal 1) and 1111 1111 (decimal 255) represent a relative force applied to a key. A value of 1 represents the lowest force value detectable by the key, and 255 represents the maximum force reportable by the key (i.e., application of further force does not cause the force data value to change). A force data value of 0000 0000 is a null force indicator signaling an absence of data quantifying force on a key. In other words, a null indicator is used to indicate that a key is not able to quantify the force applied to the key. In some keyboards, for example, less than all of the keys may be force-sensing; when such a non-force-sensing key is pressed, "0000 0000" is inserted into the box 45 corresponding to that key. By inserting a null force indicator for a non-force-sensing key into the HID report, a computer is able to discriminate between force-sensing and non-force-sensing keys. Although 0000 0000 is used in one embodiment as the null force indicator, this need not be the case. Another value could be chosen for use as the null force indicator within an HID report.

Figure 3:
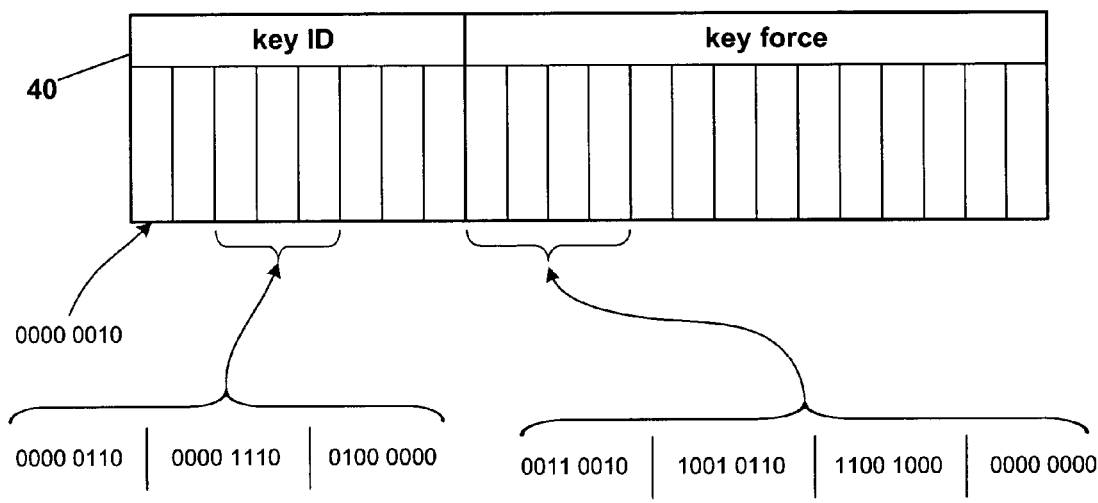
FIG. 3 is a more specific example of an HID report.

FIG. 3 is a more specific partial example of an HID report 40 using the format of FIG. 2. The report of FIG. 3 indicates (with keyboard page usage IDs from the USB HID Usage Tables) that the right alt, C and K keys are pressed with respective force values of 50, 150 and 200. The report of FIG. 3 further indicates that the F7 key is pressed, but that it is not a force-sensing key. In at least one embodiment, key force values (boxes 45) are in the same order as their corresponding key identifiers (boxes 41 and 43). In the embodiment of FIGS. 2 and 3, up to 14 separate keys can be reported in a single HID report. The HID report format of FIGS. 2 and 3 is not the only possible report format. As described in the previously-mentioned USB documentation, for example, an HID report descriptor from keyboard 2 could specify a different format for keyboard data.

Returning to FIG. 1, an HID report from keyboard 2 is received by a computer at a USB bus 4, the operation of which is controlled by one or more USB drivers in a USB driver stack 6. An HID minidriver 8 (e.g., hidusb.sys in the WINDOWS® operating system) contains lower-level USB drivers for operating and communicating with keyboard 2. The HID minidriver is in turn used by an HID class driver 10 (e.g., hidclass.sys in the WINDOWS® operating system) to access keyboard 2. In HID class driver 10, the HID report is parsed into separate data components. An HID mapper driver 12 (e.g., kbdhid.sys in the WINDOWS® operating system) then associates the parsed key identifiers with the force values. HID mapper driver 12 also tracks which keys are currently down (i.e., are being pressed). In particular, and in some embodiments, keyboard 2 only generates an HID report when there is a change in the condition of one or more keyboard keys: when a key is pressed, when a key is released, or when the amount of pressure upon a key changes. When an HID report is generated, however, it only refers to keys that are down. In order to determine whether a key is up (i.e., no longer being pressed), HID mapper driver 12 stores the identifiers for all keys which an HID report indicates as down. When the next HID report is received, it is compared to the key identifiers stored from the prior report. If a key described as down in the prior report is not mentioned in the following report, that key is now up.

As described in more detail below, HID mapper driver 12 also generates automatic "key down" messages for keys that a user holds down. HID mapper driver 12 may also provide an input/output (I/O) interface between HID class driver 10 and a non-HID keyboard class driver 14 (e.g., kbdclass.sys in the WINDOWS® operating system).

Key data from mapper driver 12 is then sent (directly or via keyboard class driver 14) to kernel-mode subsystem 16. In at least one embodiment of the invention implemented in the WINDOWS® operating system, kernel-mode subsystem 16 is win32k.sys. Subsystem 16, among numerous other functions, is responsible for generating messages to application programs (such as applications 20 and 30) that have registered with subsystem 16 via a user mode user interface manager 18 (user32.dll in the WINDOWS® operating system) and requested input data from keyboard 2. Subsystem 16, after receiving a keyboard data message from driver 12 (via driver 14), then generates keyboard input messages for applications 20 and 30, as well as for any other registered applications. Subsystem 16 places those keyboard input messages in separate message queues for the applications. Application programs 20 and 30 periodically retrieve messages in their respective queues (again, via user interface manager 18) and act upon the messages in accordance with their individual programming instructions.

Figure 4:
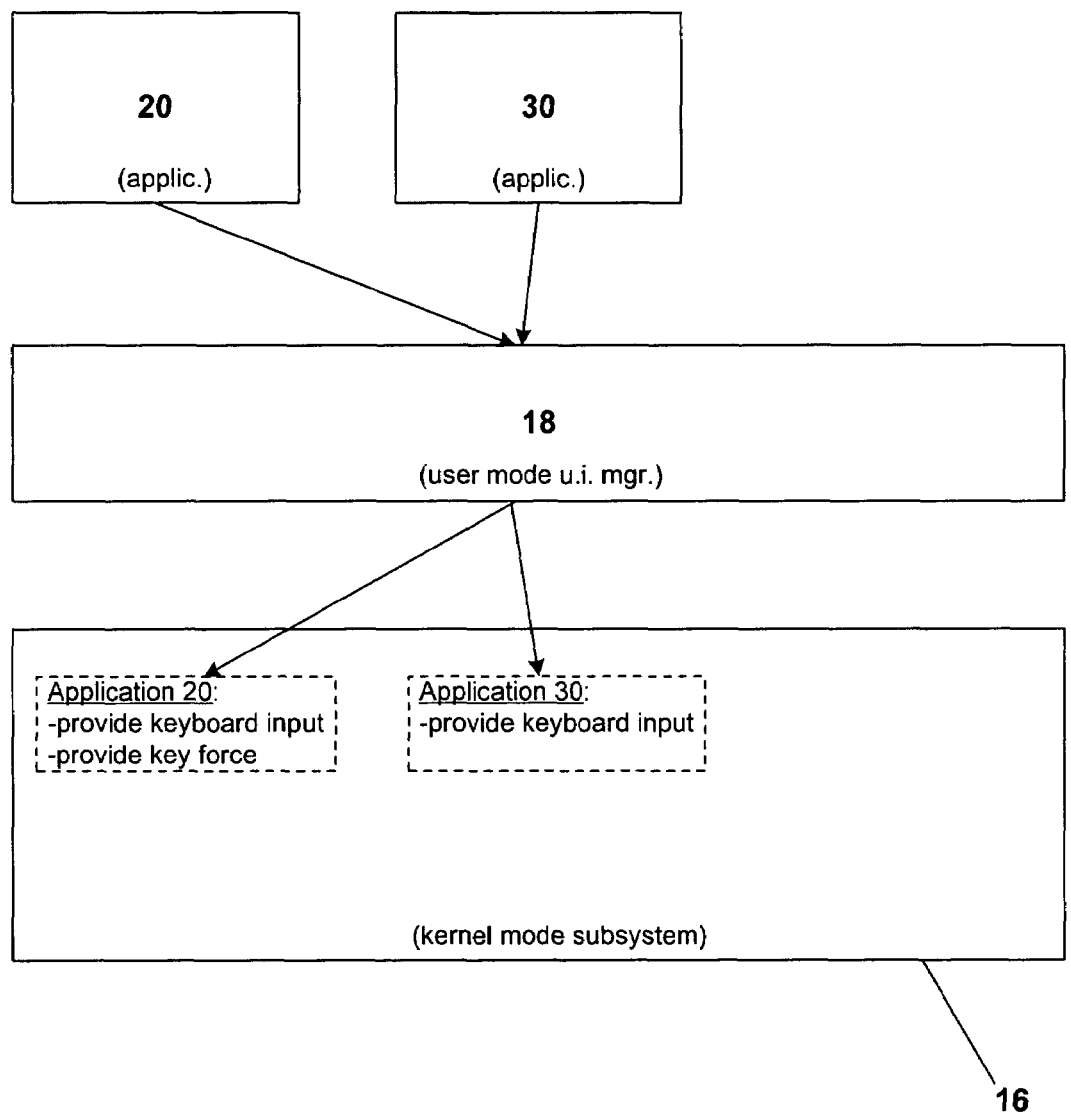
FIG. 4 is a block diagram showing registration of application software programs to receive keyboard input.

FIGS. 4-9 are block diagrams further illustrating an embodiment of the invention. In FIG. 4, applications 20 and 30 register with subsystem 16. In the example, application 20 is a software program that has been developed to receive and make use of key force data from a force-sensing keyboard. Application 20 could be a word processing program which changes attributes of a typed character based upon how hard a user may press upon a key. For example, pressing a key with more force may cause a character to be typed in a bold-faced or larger sized font, may cause a font color to change, or may otherwise provide additional data from the user in connection with the pressed key. Application 20 could be a game, and increased force upon various keys could change the manner in which the game is played. For example, a player might press one key to fire a weapon in the game, another key to move a screen image, etc. Pressing the assigned keys with increased force could cause the weapon to fire faster, the screen image to move faster, etc. As yet another example, application 20 could be an e-mail or Internet chat client. Pressing various keys with increased force might permit a user to change the size, color, or other features of a message to convey a sense of emotion. By way of illustration, an angry user sending a message could type the message with more force and cause the message to be in all capital letters. Numerous other uses for key force data are possible for these and other types of applications.

Because application 20 can make use of key force data, it registers with subsystem 16 to receive "raw" data from keyboard 2 that includes key force data. Application 30 is an application that was not developed to recognize key force data, but which also uses "raw" keyboard data. In the WINDOWS® operating system, for example, each application is automatically registered to receive certain keyboard data while that application is in the foreground. The application would receive this data via a $WM_{13}KEYDOWN$ or $WM_{13}$ CHAR message. Because of space limitations in these messages, and so as to avoid causing problems with older (or "legacy") application programs, these messages only contain a limited amount of keyboard data. However, applications can also register to receive raw keyboard data via a WM_iNPUT message (discussed below). These messages can contain more extensive data from a keyboard, and are also provided to the application when it is in the background. Application 30 registers with subsystem 16 to receive raw data from keyboard 2, via a WM_INPUT message, but does not explicitly request key force data.

In an embodiment of the invention implemented in the WINDOWS® operating system, applications 20 and 30 register with subsystem 16 using a RegisterRawInputDevices() function, reproduced at Appendix A. Contained within that function is a pointer to a structure named RAWINPUTDEVICE, reproduced at Appendix B. If an application wishes to receive key force update data, the flag RIDEV_KEYPRESSURE is set.

Figure 5:
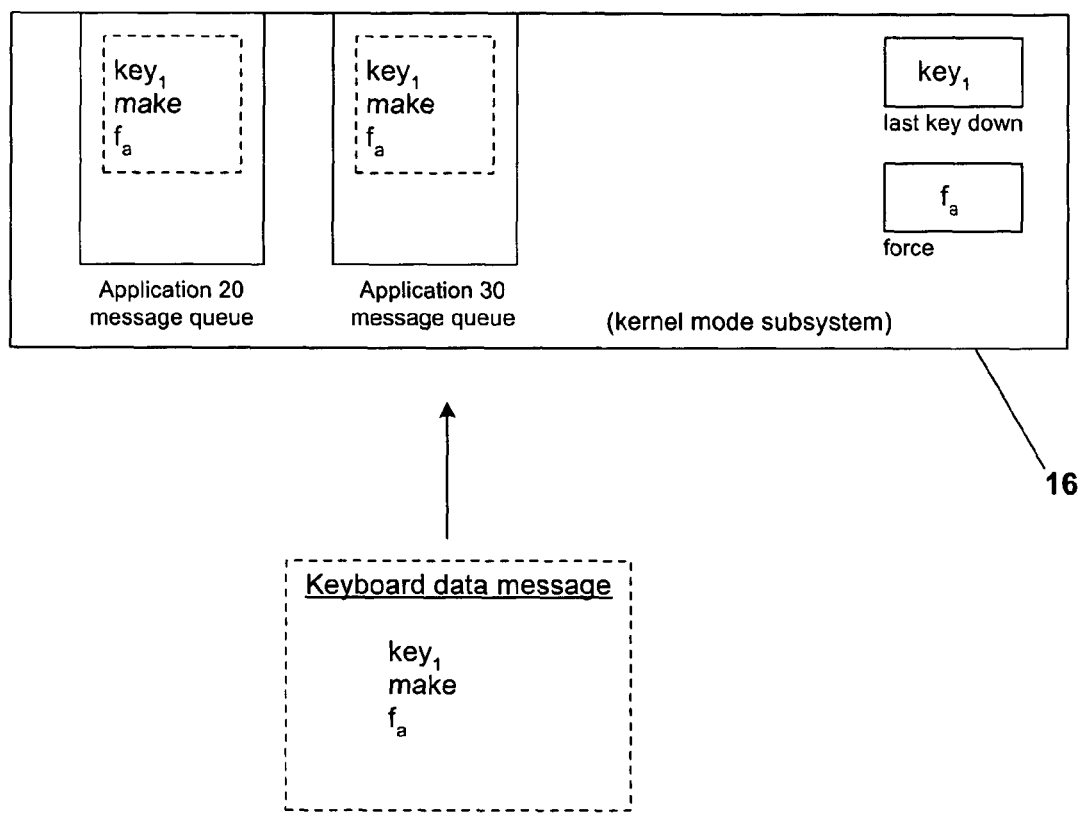
FIG. 5 is a block diagram showing software messages received and generated according to at least one embodiment of the invention.

In FIG. 5, subsystem 16 receives keyboard data from an upper level driver in the driver stack. For purposes of the example, it will be assumed that subsystem 16 receives keyboard data messages from driver 12 via driver 14. In one embodiment of the invention implemented in the WINDOWS® operating system, subsystem 16 receives keyboard data in a KEYBOARD_INPUT_DATA structure (reproduced at Appendix C). The keyboard data transferred to subsystem 16 includes an identification code (e.g., an HID usage ID, a key scan code, or other identifier) for the key at issue, shown generically as "$key_1$" in FIG. 5. The keyboard data further indicates what has happened to the key, e.g., the key is pressed/down ("make") or released/up. In at least one embodiment of the invention, the pressing ("make") or releasing ("break") of a key is communicated as a "KEY_MAKE" or "KEY_BREAK" flag contained within a KEYBOARD_INPUT_DATA structure. The keyboard data message also includes the force applied to $key_1$ ("$f_a$"). The keyboard data message lacks a force update indicator, thereby indicating that the force value in the message is not a force update for a currently pressed key. In one embodiment of the invention, and as shown in Appendix C, the KEYBOARD_INPUT_DATA structure is modified to contain a PressureData and a PressureExtended data structure. PressureData is an 8-bit variable used to transmit a value for force exerted on a key. The bits contain a force value between 0-255. For example, "0110 1011" corresponds to a key force value of 107. PressureExtended is an 8-bit variable used to indicate that the force value is an updated value. The high order bit is set to "1" to indicate an update. For example, "1000 0000" signals an updated key force. The PressureData and PressureExtended structures replace a previously reserved 16-bit field in the KEYBOARD_INPUT_DATA structure. A "union" class preserves the "Reserved" name of the field in the event that, e.g., an existing program relies upon the presence of the "Reserved" field name.

Upon receiving the keyboard data, subsystem 16 prepares WM_INPUT messages for applications that have registered to receive raw keyboard data. Because application 20 has registered for raw keyboard data and for force data, subsystem 16 generates a message for application 20 and places that message in the message queue for application 20. As shown in FIG. 5, that message identifies the key at issue ("key$_1$"), what has occurred ("make") and the force value ("f$_a$"). Similarly, and because application 30 has also registered to receive raw keyboard data, subsystem 16 generates a message for application 30 and places the message in the application 30 message queue. Although application 30 did not register to receive force data, force data is included in the application 30 message for efficiency reasons. In other words, subsystem 16 is not required to generate two types of messages indicating an initial key press. In other embodiments, key force data could be omitted from messages to application 30 indicating an initial key press. For purposes which will be explained below, subsystem 16 also stores the most recently received force value for the last key pressed by a user ("last key down"). Not shown in FIG. 5 or subsequent FIGS. are applications that did not register for raw keyboard input. As indicated above, any such application, if present, would automatically receive WM_KEYDOWN or WM_CHAR messages when that application is in the foreground. If such an application were present and in the foreground, subsystem 16 would generate a WM_KEYDOWN or WM_CHAR message for the foreground application in addition to WM_INPUT messages for applications 20 and 30, but would not include force data in the WM_KEYDOWN or WM_CHAR message.

In an embodiment of the invention implemented in the WINDOWS® operating system, and as previously discussed, messages to applications 20 and 30 are in the form of WM_INPUT messages (reproduced at Appendix D). The WM_INPUT message contains a handle (lParam) to another structure RAWINPUT (reproduced at Appendix E), which in turn contains a RAWKEYBOARD structure (Appendix F) by operation of a UNION data structure. A field of the RAWKEYBOARD structure then contains, again by operation of a UNION data structure, the PressureData and PressureExtended data structures. As previously discussed, PressureData is an 8-bit variable used to transmit a value for force exerted on a key and PressureExtended is an 8-bit variable used to indicate whether the force value is an updated value. The PressureData and PressureExtended structures replace a previously reserved 16-bit field in the RAWKEYBOARD structure. A UNION class preserves the "Reserved" name of the field in the event that any application relies upon the presence of the "Reserved" field name. In this manner, the same data structure containing force data can be used can be used to communicate with legacy and newer application programs.

Figure 6:
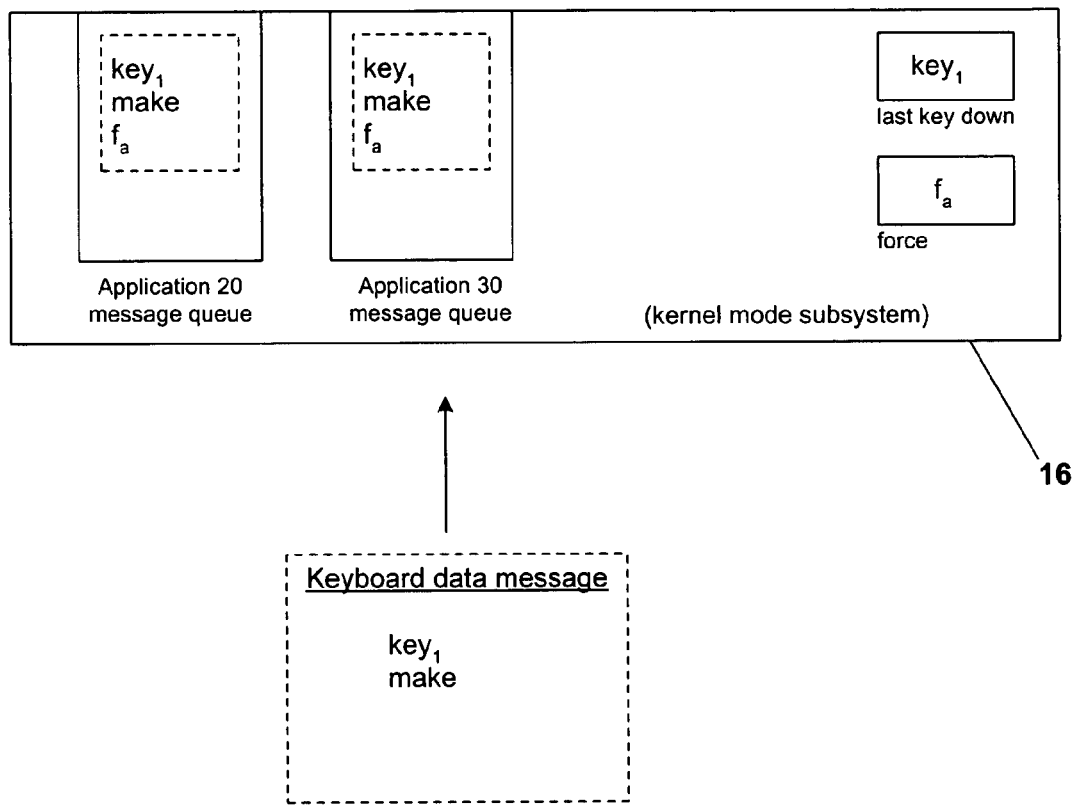
FIG. 6 is another block diagram showing software messages received and generated according to at least one embodiment of the invention.

FIG. 6 shows subsystem 16 receiving a subsequent keyboard data message from driver 12 (not shown in FIG. 6, but shown in FIG. 1). In this instance, driver 12 has automatically generated this message. As explained in more detail below, driver software in at least one embodiment automatically generates, for the last key pressed by the user, repeated messages indicating that the key is down. Driver 12 generates these automatic key down messages at a frequency based on the force applied to the key. Because the message to subsystem 16 in FIG. 6 was automatically generated, no key force data is included in the message. In other words, the message was not generated in response to an actual key press having actual force data, but was instead generated automatically based on a previously-reported key press. In one embodiment of the invention, the keyboard data message in FIG. 6 is also a KEYBOARD_DATA_INPUT structure, but lacks a PressureData or PressureExtended data structure.

Upon receiving the subsequent keyboard data message in FIG. 6, subsystem 16 again prepares messages for applications 20 and 30 and places those messages in the respective queues. Although the message from driver 12 does not contain key force data for key$_1$, subsystem 16 previously stored the most recent force value for the last key down. Because the key in the latest driver message (key$_1$) is the last key down, subsystem 16 is able to insert that force value into the message for application 20. In this manner, programming errors can be avoided if application 20 is expecting a key force value in every message. Although not utilized by application 30, which did not register to receive force data, key force data is also inserted into the message for application 30.

Figure 7:
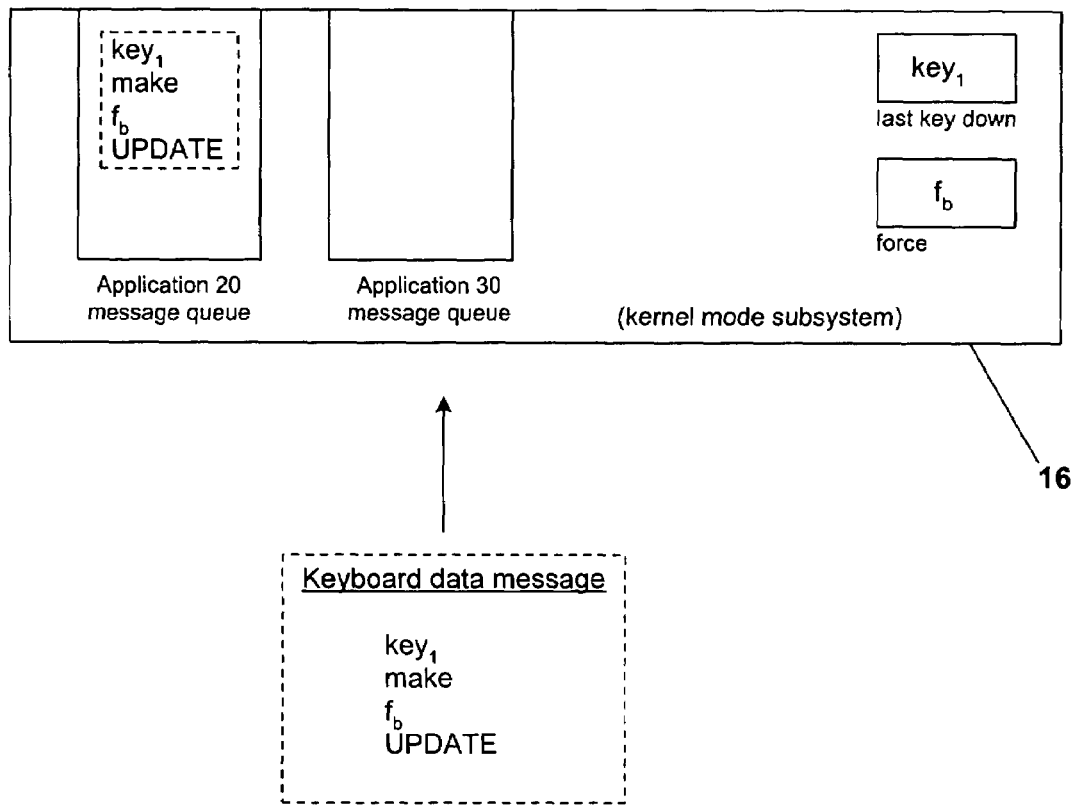
FIG. 7 is another block diagram showing software messages received and generated according to at least one embodiment of the invention.

FIG. 7 shows the next driver message to subsystem 16. In this instance, the keyboard data message from driver 12 contains an update of an earlier force value for key$_1$. Subsystem 16 prepares a message for application 20 that includes the updated force value (f$_b$), together with an indication that it is an update of an earlier force value for the same key (e.g., a PressureExtended structure contained in the WM_INPUT message to application 20 has a value of 1000 0000). Subsystem 16 does not generate a message for application 30 in this instance. For example, if force f$_b$ is less than previous force f$_a$, the rate of automatic "key down" messages generated by the driver decreases, and it may not yet be time for an automatically repeated key down message. If subsystem 16 were to generate a message to application 30 that simply lacked key force information, application 30 would thus receive key repeats at a faster rate than the user may intend. If force f$_b$ is greater than force f$_a$ and the rate of automatic key repeats increases such that it is time for the next automatic key down message, driver 12 simply generates a message containing the force update and another message for the automatic key down message. Because the rate at which HID reports are received and processed greatly exceeds the maximum key auto-repeat rate, the user perceives little or no latency in the change of the key repeat rate. As also shown in FIG. 7, the latest force update is for the last key down, and subsystem 16 stores the most recent force value for the last key down.

Figure 8:
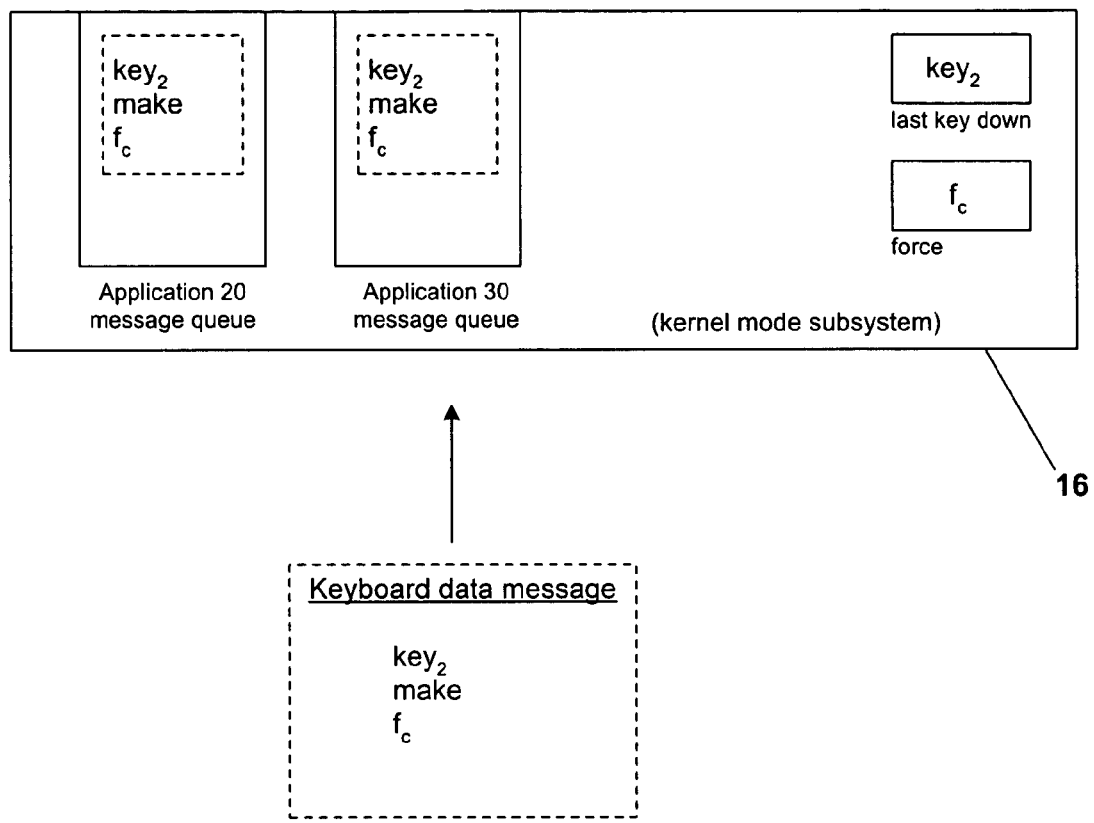
FIG. 8 is another block diagram showing software messages received and generated according to at least one embodiment of the invention.

FIG. 8 shows what happens when a new key becomes the last key down. In FIG. 8, subsystem 16 receives a subsequent keyboard data message from driver 12 indicating that key$_2$ has been pressed, together with a force value for that key press, but lacking an indication that it is an update. Subsystem 16 prepares corresponding messages to applications 20 and 30 for the new key press and places the messages in the proper queues. Because key$_2$ is now the last key down, subsystem 16 stores the identifier for key$_2$ and its force value. At this point, and as far as application 20 is concerned, key$_1$ and key$_2$ are being simultaneously pressed (subsystem 16 has not sent a message indicating a "break" for key$_1$) with respective force values of f$_b$ and f$_c$. Application 30 also recognizes both keys as down, but is not tracking the force values. At this point, driver 12 will no longer automatically generate key down messages regarding key$_1$. Even though key$_1$ is still being pressed, automatic key down messages are only generated for the last key down, which is now key$_2$.

Figure 9:
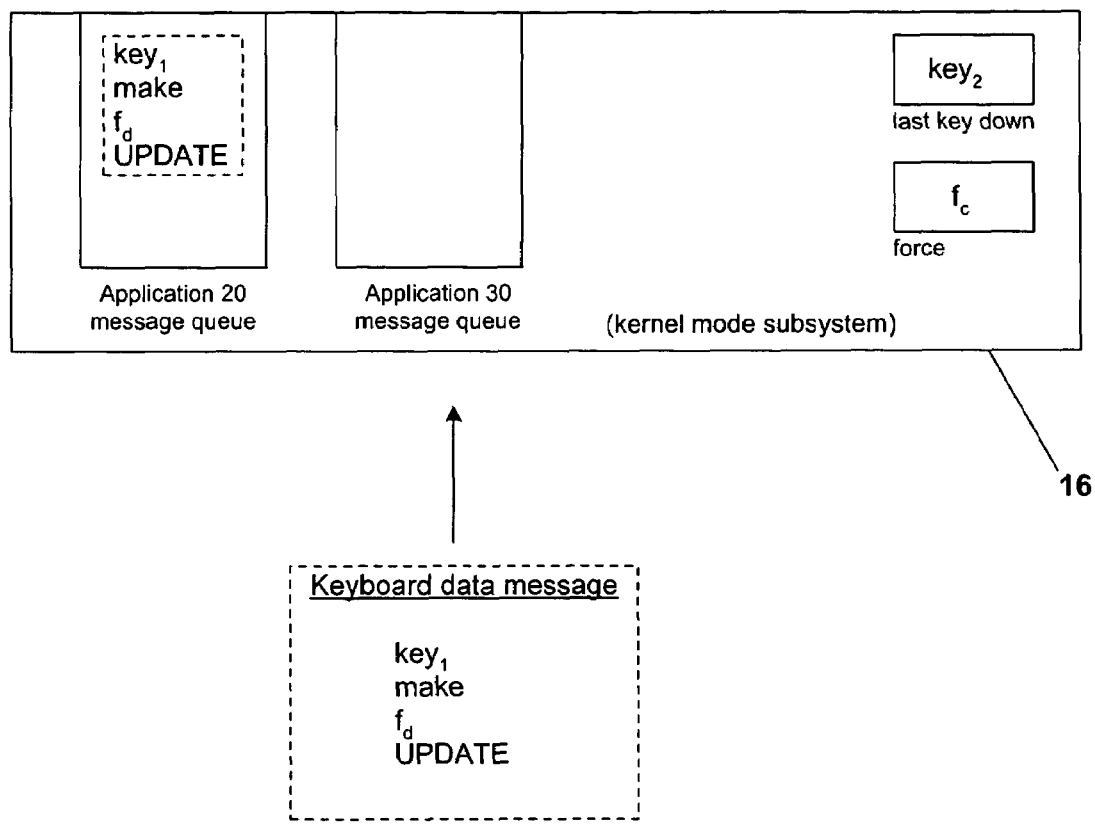
FIG. 9 is another block diagram showing software messages received and generated according to at least one embodiment of the invention.

FIG. 9 shows a subsequent keyboard data message from driver 12 to subsystem 16. As shown in FIG. 9, this message indicates that it is an updated force value for key$_1$. Subsystem 16 generates a force update message for application 20 with the new force value (f$_d$), but does not generate a message for application 30 or revise the stored values for last key down or force for last key down.

Not shown in FIGS. 5-9 is a keyboard data message from driver 12 or a keyboard input message from subsystem 16 corresponding to a user releasing a key. Because a released key would have no force exerted upon it, no force information is communicated as part of such a message. In one embodiment, the KEYBOARD_DATA_INPUT and WM_INPUT messages for a key break contain PressureData and PressureExtended structures with 0 values.

Applications 20 and 30 (as well as other applications registering for keyboard input) also receive simulated keyboard data. In other words, other application or operating system programs can be configured to send a message to application 20 or 30 containing the same data that would be generated by an actual key press. In an embodiment implemented in the WINDOWS®operating system, a simulated force-sensing keyboard event is communicated to subsystem 16 by a KEYBDINPUT data structure (reproduced at Appendix G). If the simulated keyboard message is to include simulated keyboard force data, the KEYBDINPUT structure contains a KEYEVENTF_PRESSUREDATA flag. If this flag is set, force data in a PressureData field of the KEYBDINPUT structure is propagated to applications 20 and 30. If a simulated keyboard message includes a simulated force update for a key that is already down (whether the key is actually down or simulated as down), the KEYBDINPUT structure contains a KEYEVENTF_PRESSUREUPDATE flag. Force data in the PressureData field of the KEYBDINPUT structure is then propagated as a force update to applications that registered for key force data (including force updates). If subsystem 16 receives a KEYBDINPUT structure containing a simulated force update for a key that is not either simulated as down or actually down, the data is discarded. In at least one embodiment, simulated keyboard input, including both a simulated up/down state and a simulated force value (or force update) is flagged so as to be distinguishable from actual keyboard input. In this manner, applications can be developed that disallow simulated keyboard input. For example, certain applications may disallow simulated keyboard input for security reasons.

Figure 10:
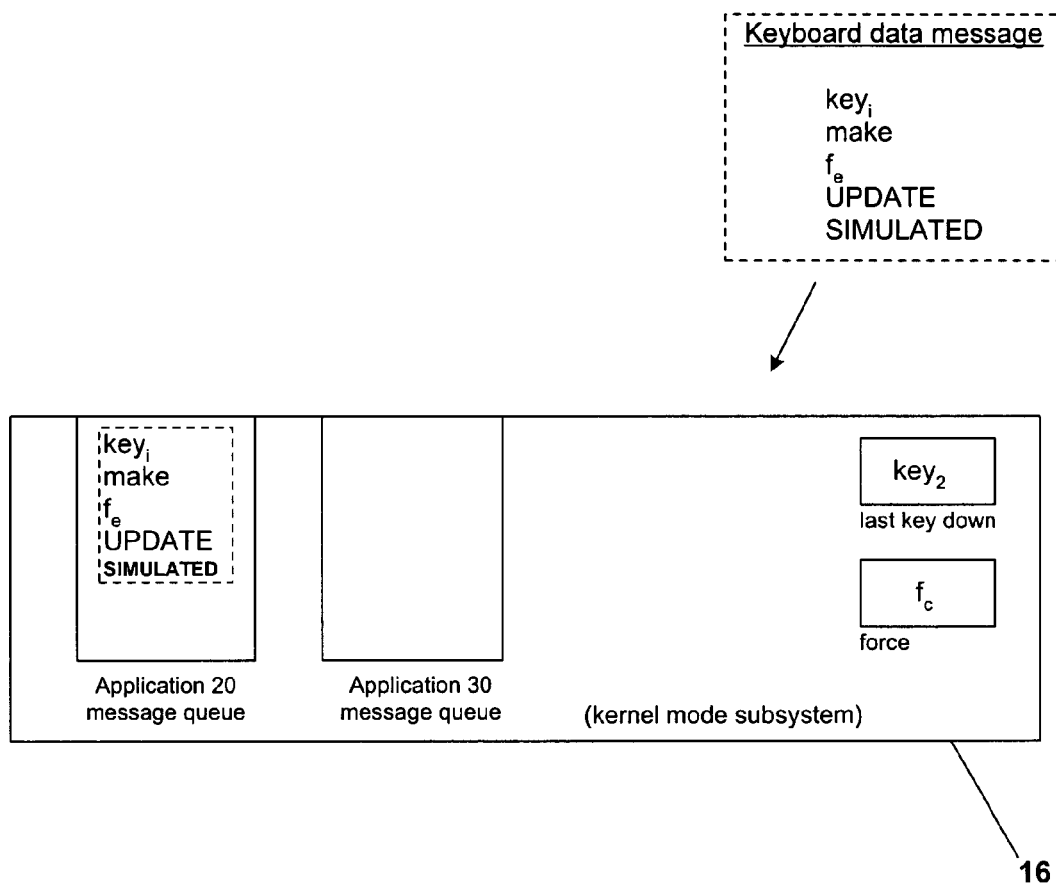
FIG. 10 is another block diagram showing software messages received and generated according to at least one embodiment of the invention.

FIG. 10 shows one example of a simulated keyboard message sent to subsystem 16 by an application program (not shown) via user interface manager 18 (also not shown). The example of FIG. 10 assumes a previous message indicating an actual or simulated press of key$_i$ was sent to subsystem 16 subsequent to the events described in FIG. 9, but prior to the events described in FIG. 10. In FIG. 10, the keyboard data message reflects a simulated force update (to force $f_e$) on key$_i$. Subsystem 16 then generates and sends a message to application 20 indicating a simulated key force update. Because application 30 did not register to receive key force data, subsystem 16 does not generate a simulated key force update for application 30. In some embodiments, subsystem 16 separately tracks keys actually down and keys simulated as down. Although not shown, subsystem 16 could similarly store a key identifier and force value for the last key actually down and a separate key identifier and force value for the last key simulated as down.

As previously indicated, driver 12 performs certain processing of data from keyboard 2 prior to passing that data to subsystem 16. At periodic intervals, HID reports are retrieved from keyboard 2 and key data in the reports are passed up the driver stack. Initially, the HID reports are processed to extract the identity of the keys that have been pressed and the force value associated with the key presses. A null indicator (0 in one embodiment) from a keyboard means that the particular key does not have force sensing capability. Driver 12 also stores the identity of all keys identified by an HID report as being pressed, together with the latest force value for the key press. As part of processing an HID report, driver 12 also determines which of the keys previously identified as being down are not described in the latest HID report. If a key previously identified as down is not described in the latest HID report, the key is no longer down, and a keyboard data message indicating a break for that key is generated. Driver 12 further determines if any of force values in an HID report represent a change from a previous force value stored for that key. If so, driver 12 generates a keyboard data message for transmission of a key force update to subsystem 16.

In at least one embodiment, driver 12 also uses stored key force data for the most recently pressed key (the last key down) to automatically generate repeating key down messages. In conventional systems using non-force-sensing keyboards, keys are (typically) automatically repeated after being held down for a certain amount of time. For example, when a text editor, word processing program or other application is running on a computer, holding down a particular character key may, after a preset delay period, cause the corresponding character to be repeatedly typed or otherwise displayed on the screen at a previously-set repeat rate. The hold-down time necessary to trigger the repeating character display and the rate of repetition (the "typematic" or key auto-repeat rate) are usually preset system parameters which may or may not be user-adjustable. In some existing systems, a keyboard driver determines how long a key has remained depressed. If that time exceeds the preset hold-down time, and if no other keys have been depressed in the interim, the driver then issues a series of "key down" signals at the auto-repeat rate until the key is released or another key is pressed.

In at least one embodiment, driver 12 generates automatically repeating key down messages based on the force applied to the last key the user pressed and is still holding down. Using a transfer function (described below), driver 12 maps the key force to an auto-repeat rate. As long as the key is held down at that level of force (and no other key is pressed), the driver automatically generates key down messages at the mapped auto-repeat rate. If the force on the key is increased or reduced, the auto-repeat rate is remapped and increased or reduced as required. Among other advantages, this avoids the need for a user to preset an auto-repeat rate for all applications. Instead, a user can dynamically and conveniently modify the auto-repeat rate. If a second key is pressed in the interim, the driver ceases generating automatic key down messages for the first held key. The driver then maps a new auto-repeat rate for the second key press and begins automatically generating key down messages at the newly mapped rate for the second key. In some embodiments, automatic key down messages for the second key are not generated until the first key is released (in other words, if the first key is held and the second key is pressed, auto-repeats for the second key do not begin until after the first key is released). In still other embodiments, a repeat invoke delay is also programmed into the key force-controlled auto-repeat function. Specifically, the auto-repeat rate is determined by the force applied to the key, but driver 12 does not commence automatically generating key down messages until the key has been held down for a certain amount of time. However, a timer for this delay is only restarted on the initial pressing of a key. In other words, the timer does not restart when a user merely changes the amount force applied to the last-pressed key.

Figure 11:
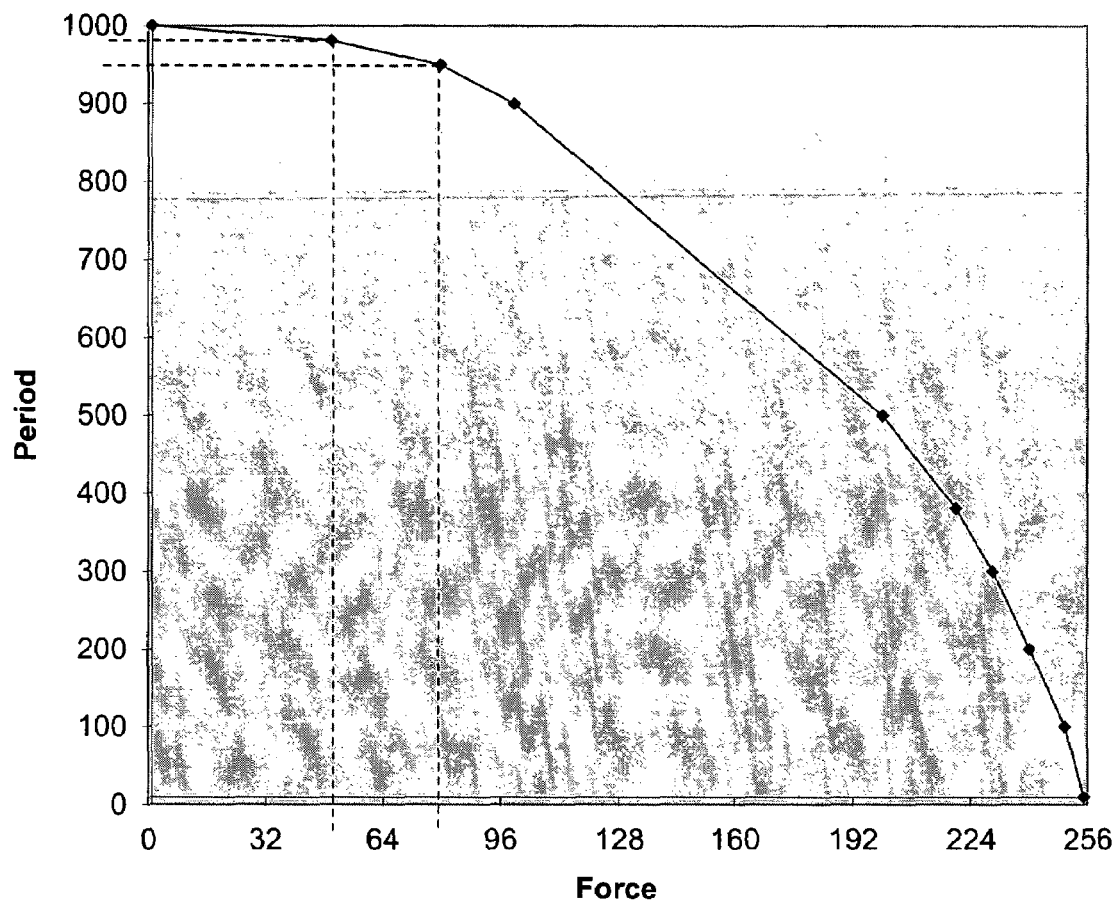
FIG. 11 is an example of a transfer function according to at least one embodiment of the invention.

Numerous transfer functions can be used for calculating the auto-repeat rate. In one embodiment, optimal auto-repeat rates for various ranges of key pressure are empirically determined via user tests and plotted on a graph. FIG. 11 is an example of such a graph. As shown in FIG. 11, force data values (horizontal axis) are plotted against auto-repeat period between key repeats (vertical axis). Because many users may be unable to discriminate a 1-bit difference in force level exerted upon a key, the number of discrete force values mapped to discrete auto-repeat rates can be less than the entire available range of resolution. Referring to FIG. 11, for example, a key force from 1 to 56 would result in a period between key repeats of approximately 975, a key force greater than 56 and less than 88 would result in a period between key repeats of approximately 950, etc. As seen in FIG. 11, the force values corresponding to an initial key press correspond to gradually increasing auto-repeat rates, while further force increases correspond to more sharply increasing auto-repeat rates. In one embodiment, the transfer function of FIG. 11 is implemented as a look-up table.

The transfer function may be variable. In other words, the specific key repeat rate mapped to a particular key force can be adjusted so as to be more pleasing (or otherwise more suitable) to the keyboard user. In one embodiment, a user can select from various pre-configured transfer functions. In other embodiments, a user is provided with a graphical interface (e.g., a slider bar, a graph with points that can be selected and moved, a spreadsheet, etc.) to assign repeat rates to various ranges of key force. In still other embodiments, the transfer function is dynamically adjusted as a user types. For example, the pattern of a user's typing could be analyzed to determine which of several predefined patterns it most closely resembles, and a transfer function assigned based on the analysis. As another example, the force applied by a user before auto-repeat is invoked (i.e., before expiration of the invoke delay timer) could be computed on a rolling average basis; the average can then be set as the floor for the transfer function (i.e., no auto-repeat occurs until the floor force level is exceeded). In yet a further embodiment, the delay before auto-repeat is invoked could be reduced or eliminated once a "floor" force is determined. Instead of an average, the transfer could be modified based on a standard deviation, Gaussian distribution, median or other statistical processing of key force data over a certain time period.

If a keyboard lacks force-sensing capability, or if a particular key lacks such capability, driver 12 can then default to generating automatic key down messages (at a preset rate) when the key has been depressed for a certain time.

Figure 12:
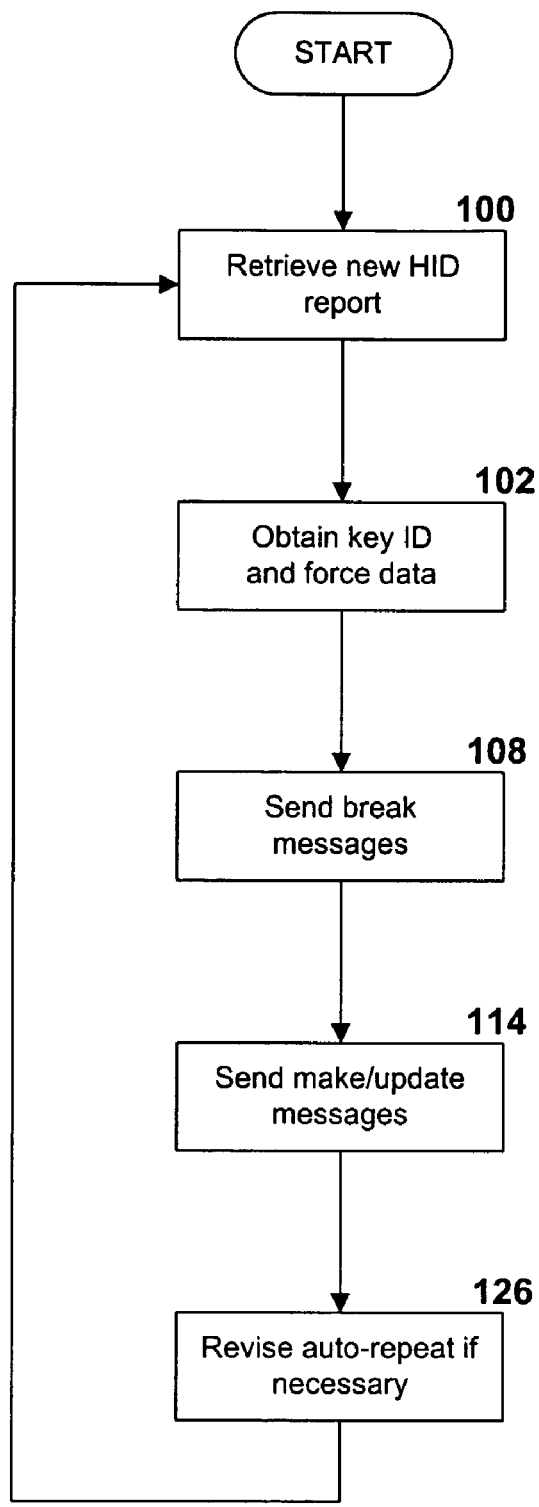
FIG. 12 is a flow chart showing aspects of at least one embodiment of the invention.

FIG. 12 is a flow chart showing processing by driver 12 according to one embodiment of the invention. After starting, driver 12 retrieves an HID report at block 100. Driver 12 examines the HID report at block 102 and obtains the identifiers for all keys in the report and any associated force data. As part of this step, or as part of a previous step not shown in FIG. 12, driver 12 compares the key ID and key force data from the current HID report with key ID and key force data from the previous HID report. Driver 12 then determines whether any keys previously reported as down should now be reported as up. In particular, driver 12 determines if any keys identified in the previous HID report are not identified in the current HID report. If any keys listed in the previous HID report are absent from the current HID report, those keys are no longer being pressed. Driver 12 then generates one or more keyboard data messages (one message per key) at block 108 to indicate any keys that are now up.

At block 114, driver 12 generates and sends an appropriate keyboard data message for each key being pressed. If the key force data does not contain a null indicator, a message containing the force value (and an indication that it is an update of a prior value, if appropriate) is sent. If the force data contains a null indicator and corresponds to an initial key press (i.e., the first detection of a key press during an interval when the key is continuously held down), a message is sent indicating that the key is now down. If the force data value contains a null indicator and does not correspond to an initial key press, and if the key is the last key down, no message is sent until it is time for an automatically generated key repeat. In at least one embodiment, a separate programming thread (not shown in FIG. 12) of driver 12 generates automatic key down messages at a key auto-repeat rate. As previously discussed, the auto-repeat rate is determined by key force or (for non-force-sensing keys) by preset value after the key is held for a preset time period.

At block 126, driver 12 revises the auto-repeat rate if necessary. If the last key down included non-null force data, any change in the force value may require an adjustment to the auto-repeat rate. If the last key down has been released, key auto-repeat is canceled until another key is pressed. If a new key is now the last key down, an auto-repeat rate for the new key is established and automatically repeating key down messages are generated in another thread (not shown) after an invoke delay. If the key force data for the last key down contains a null indicator, and its initial key press was reported in the just-processed HID report, a delay timer is started (either in this or in another program thread). If that key remains down after the delay timer expires, key repeats at a preset system rate are then generated as long as that key is down, or until another key is pressed.

After block 126, driver 12 obtains the next HID report, and the process of FIG. 12 repeats.

Although specific examples of carrying out the invention have been described, those skilled in the art will appreciate that there are numerous variations and permutations of the above described systems and techniques that fall within the spirit and scope of the invention as set forth in the appended claims. These and other modifications are within the scope of the invention as defined by the attached claims.

Appendix A

```
BOOL RegisterRawInputDevices(
    PCRAWINPUTDEVICE pRawInputDevices,
    UINT uiNumDevices,
    UINT cbSize
);
```

Parameters:

pRawInputDevices

[in] Pointer to an an array of RAWINPUTDEVICE structures for the devices that supply the raw input.

uiNumDevices

[in] Number of RAWINPUTDEVICE structures pointed to by pRawInputDevices.

cbSize

[in] Size, in bytes, of a RAWINPUTDEVICE structure.

Return Value:

If the function succeeds, it returns TRUE. Otherwise it returns FALSE. If the function fails, call GetLastError for more information.

Appendix B

```
typedef struct tagRAWINPUTDEVICE {
    USHORT usUsagePage;
    USHORT usUsage;
    DWORD dwFlags;
    HWND hwndTarget;
} RAWINPUTDEVICE, *PRAWINPUTDEVICE,
*LPRAWINPUTDEVICE;
```

Members:
usUsagePage
Top level collection Usage page for the raw input device.
usUsage
Top level collection Usage for the raw input device.
dwFlags
Mode flag that specifies how to interpret the information provided by usUsagePage and usUsage. It can be zero (the default) or one of various values. One of those values is RIDEV_KEYPRESSURE.
hwndTarget
Handle to the target device. If NULL, it follows the keyboard focus.

Appendix C

```
typedef struct _KEYBOARD_INPUT_DATA {
    USHORT UnitId;
    USHORT MakeCode;
    USHORT Flags;
    union {
        USHORT Reserved
        struct {
            UCHAR PressureData;
            UCHAR PressureExtended;
        };
    };
    ULONG ExtraInformation;
} KEYBOARD_INPUT_DATA, *PKEYBOARD_INPUT_DATA;
```

Members:
UnitId
Not used.
MakeCode
Specifies the scan code associated with a key press.
Flags
Specifies a bitwise OR of one or more of the following flags that indicate whether a key was pressed or released, and other miscellaneous information.

| Value | Meaning |
|---|---|
| KEY_MAKE | The key was pressed. |
| KEY_BREAK | The key was released. |
| KEY_E0 | Extended scan code used to indicate special keyboard functions. |
| KEY_E1 | Extended scan code used to indicate special keyboard functions. |

PressureData
An 8-bit variable used to transmit a value for force exerted on a key. The bits contain a force value between 0-255. For example, "0110 1011" corresponds to a key force value of 107.

PressureExtended
An 8-bit variable used to indicate that a force value is an updated force value. The high order bit is set to "1" to indicate that this is an update. For example, "1000 0000" corresponds to an updated key force.

ExtraInformation
Specifies device-specific information associated with a keyboard event.

Appendix D

```
WM_INPUT
    WPARAM wParam
    lpRawInput = (LPRAWINPUT) lParam;
```

Parameters:
wParam
Input code. This parameter can be one of two values:
RIM_INPUT
Input occurred while the application was in the foreground. The application must call DefWindowProc so the system can perform cleanup.
RIM_INPUTSINK
Input occurred while the application was not in the foreground. The application must call DefWindowProc so the system can perform the cleanup.
lParam
Handle to the RAWINPUT structure that contains the raw input from the device.

Appendix E

```
typedef struct tagRAWINPUT {
    RAWINPUTHEADER header;
    union {
        RAWMOUSE mouse;
        RAWKEYBOARD keyboard;
        RAWHID hid;
    } data;
} RAWINPUT, *PRAWINPUT; *LPRAWINPUT;
```

Members:
header
A RAWINPUTHEADER structure for the raw input data.
mouse
If the data comes from a mouse, this is the RAWMOUSE structure for the raw input data.
keyboard
If the data comes from a keyboard, this is the RAWKEYBOARD structure for the raw input data.
hid
If the data comes from an Human Interface Device (HID), this is the RAWHID structure for the raw input data.

Appendix F

```
typedef struct tagRAWKEYBOARD {
    USHORT MakeCode;
    USHORT Flags;
    union {
        USHORT Reserved;
        struct {
            UCHAR PressureData;
            UCHAR PressureExtended;
        };
    };
    USHORT VKey;
    UINT Message;
    ULONG ExtraInformation;
} RAWKEYBOARD, *PRAWKEYBOARD, *LPRAWKEYBOARD;
```

Members:

MakeCode

Scan code from the key depression. The scan code for keyboard overrun is KEYBOARD_OVERRUN_MAKE_CODE.

Flags

Flags for scan code information. It can be one or more of the following.
RI_KEY_MAKE
RI_KEY_BREAK
RI_KEY_E0
RI_KEY_E1
RI_KEY_TERMSRV_SET_LED
RI_KEY_TERMSRV_SHADOW PressureData An 8-bit variable used to transmit a value for force exerted on a key. The bits contain a force value between 0-255. For example, "0110 1011" corresponds to a key force value of 107.

PressureExtended

An 8-bit variable used to indicate that a force value is an updated force value. The high order bit is set to "1" to indicate that this is an update. For example, "1000 0000" corresponds to an updated key force.

VKey

Microsoft Windows message compatible virtual-key code. For more information, see Virtual-Key Codes.

Message

Corresponding window message, for example WM_KEYDOWN, WM_SYSKEYDOWN, and so forth.

ExtraInformation

Device-specific additional information for the event.

Appendix G

```
typedef struct tagKEYBDINPUT {
    WORD wVk;
    WORD wScan;
    DWORD dwFlags;
    DWORD time;
    ULONG_PTR dwExtraInfo;
    BYTE PressureData;
} KEYBDINPUT, *PKEYBDINPUT;
```

Members:

wVk

Specifies a virtual-key code. The code must be a value in the range 1 to 254. The Winuser.h header file provides macro definitions (VK_*) for each value. If the dwFlags member specifies KEYEVENTF_UNICODE, wVk must be 0.

wScan

Specifies a hardware scan code for the key. If dwFlags specifies KEYEVENTF_UNICODE, wScan specifies a Unicode character which is to be sent to the foreground application.

dwFlags

Specifies various aspects of a keystroke. This member can be certain combinations of the following values.
KEYEVENTF_EXTENDEDKEY
If specified, the scan code was preceded by a prefix byte that has the value 0xE0 (224).
KEYEVENTF_KEYUP
If specified, the key is being released. If not specified, the key is being pressed.
KEYEVENTF_SCANCODE
If specified, wScan identifies the key and wVk is ignored.
KEYEVENTF_UNICODE
Windows 2000/XP: If specified, the system synthesizes a VK_PACKET keystroke. The wVk parameter must be zero. This flag can only be combined with the KEYEVENTF_KEYUP flag.
KEYEVENTF_PRESSUREDATA
A 1-bit value used to indicate if simulated pressure data is present.
KEYEVENTF_PRESSUREUPDATE
A 1-bit value used to indicate if simulated pressure data is present.

time

Time stamp for the event, in milliseconds. If this parameter is zero, the system will provide its own time stamp.

dwExtraInfo

Specifies an additional value associated with the keystroke. Use the GetMessageExtraInfo function to obtain this information.

PressureData

An 8-bit variable used to transmit a value for simulated force exerted on a key. The bits contain a force value between 0-255. For example, "0110 1011" corresponds to a key force value of 107.

The invention claimed is:

1. A method for processing data received from a keyboard having a plurality of keys, the plurality of keys including multiple keys having respective characters assigned thereto, the plurality of keys further including one or more force-sensing keys, the method comprising:
   receiving a registration from a first application program requesting keyboard input data and key force data;
   receiving a registration from a second application program requesting keyboard input data but not requesting key force data;
   receiving keyboard data messages identifying keys that have been pressed by a user and containing force values for forces applied to the pressed keys;
   generating a first keyboard input message identifying a first pressed key and containing the force value for the first pressed key; and
   generating a second keyboard input message identifying a second pressed key and containing the force value for the second pressed key and a force update indicator.

2. The method of claim 1, further comprising:
providing the first keyboard input message to the first and second applications.

3. The method of claim 2, further comprising:
only providing the second keyboard input message to applications requesting key force data.

4. The method of claim 1, wherein the second keyboard input message is provided to the first application, and further comprising:
generating a third keyboard input message identifying a third pressed key and containing the force value for the third pressed key and a force update indicator; and
providing the third keyboard input message to the first application prior to providing a message indicating that the second pressed key is no longer being pressed.

5. The method of claim 1, comprising:
storing the identifier for the last key identified as pressed;
storing the most recently received force value for the last key identified as pressed;
receiving a keyboard data message lacking a force value and indicating that the last key identified as pressed remains pressed; and
generating a keyboard input message identifying the last key identified as pressed and containing the stored force value.

6. The method of claim 1, comprising:
receiving a simulated keyboard data message containing simulated key press data, the simulated key press data identifying an unpressed key and containing simulated key force data for the unpressed key; and
generating a third keyboard input message identifying the unpressed key, indicating a simulated key press, and containing the simulated key force value.

7. A computer-readable medium having stored thereon data representing sequences of instructions which, when executed by a processor, cause the processor to perform steps comprising:
receiving a registration from a first application program requesting keyboard input data and key force data;
receiving a registration from a second application program requesting keyboard input data but not requesting key force data;
receiving keyboard data messages identifying keys that have been pressed by a user on a keyboard having a plurality of keys, the plurality of keys including multiple keys having respective characters assigned thereto, the plurality of keys further including one or more force-sensing keys, wherein the keyboard data messages contain force values for forces applied to the pressed keys;
generating a first keyboard input message identifying a first pressed key and containing the force value for the first pressed key; and
generating a second keyboard input message identifying a second pressed key and containing the force value for the second pressed key and a force update indicator.

8. The computer-readable medium of claim 7, comprising further instructions for performing steps comprising:
providing the first keyboard input message to the first and second applications.

9. The computer-readable medium of claim 8, comprising further instructions for performing steps comprising:
only providing the second keyboard input message to applications requesting key force data.

10. The computer-readable medium of claim 7, wherein the second keyboard input message is provided to the first application, and comprising further instructions for performing steps comprising
generating a third keyboard input message identifying a third pressed key and containing the force value for the third pressed key and a force update indicator; and
providing the third keyboard input message to the first application prior to providing a message indicating that the second pressed key is no longer being pressed.

11. The computer-readable medium of claim 7, comprising further instructions for performing steps comprising:
storing the identifier for the last key identified as pressed;
storing the most recently received force value for the last key identified as pressed;
receiving a keyboard data message lacking a force value and indicating that the last key identified as pressed remains pressed; and
generating a keyboard input message identifying the last key identified as pressed and containing the stored force value.

12. The computer-readable medium of claim 7, comprising further instructions for performing steps comprising:
receiving a simulated keyboard data message containing simulated key press data, the simulated key press data identifying an unpressed key and containing simulated key force data for the unpressed key; and
generating a third keyboard input message identifying the unpressed key, indicating a simulated key press, and containing the simulated key force value.

* * * * *